F. W. SHERWOOD.
RESILIENT VEHICLE TIRE.
APPLICATION FILED DEC. 21, 1920.
1,427,331. Patented Aug. 29, 1922.
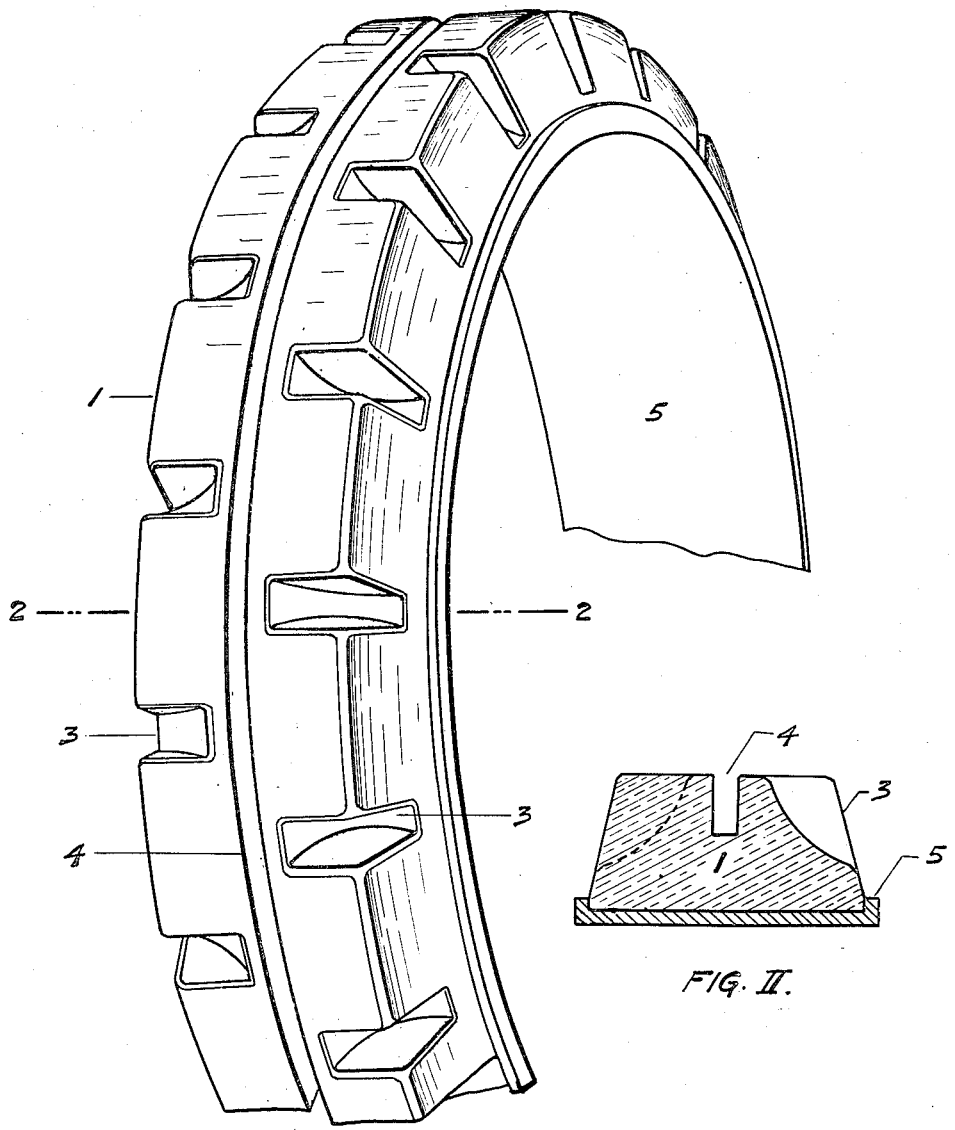
FIG. I.
FIG. II.
FIG. III.
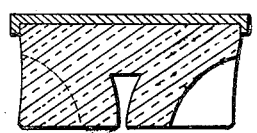
INVENTOR
FREDERICK W. SHERWOOD
BY: R.H. Waters
ATTORNEY

UNITED STATES PATENT OFFICE.

FREDERICK W. SHERWOOD, OF BROOKLYN, NEW YORK, ASSIGNOR TO KELLY-SPRINGFIELD TIRE COMPANY, OF NEW YORK, N. Y., A CORPORATION OF NEW JERSEY.

RESILIENT VEHICLE TIRE.

1,427,331.          Specification of Letters Patent.    Patented Aug. 29, 1922.

Application filed December 21, 1920. Serial No. 432,306.

*To all whom it may concern:*

Be it known that I, FREDERICK W. SHERWOOD, a citizen of the United States, residing at Brooklyn, in the county of Kings and State of New York, have invented certain new and useful Improvements in a Resilient Vehicle Tire (more generally known as a solid-type resilient truck tire), of which the following is a specification.

My invention relates to that form of resilient vehicle tire known as the solid type, particularly adapted for use on trucks intended for heavy duty, wherein it is desired to attain in a tire structure great durability in combination with the maximum resiliency consistent with its duty, and provide also efficient tractive and non-skid properties; and to attain these ends by designing the structure as a unitary article of manufacture capable of being produced free of manufacturing difficulties at an economical cost.

The invention resides in the proportions and arrangement of the openings in the structure, and has, as a particular object, the attainment of a high degree of lateral resiliency whereby the road contacting portion of the tire will be adapted to yield under the influence of unusual localized stresses in a manner preventive of injury thereto; also to insure that the stresses so incurred will be effectively diffused throughout the structure and transmitted into the metallic rim member over a considerable area of contact.

Heretofore structures of this class have provided for a reasonably satisfactory degree of circumferential resiliency in conjunction with the provision of some form of traction notches, but I am not aware that a satisfactory combination of these features with specific means for attaining suitable transverse resiliency has been obtained heretofore without sacrificing some essential quality; for instance, non-skid features; balance of structure; weight sustaining capacity, etc.

The accompanying drawing shows a preferred form for embodying my invention in the form of a heavy duty truck tire, in which:—

Figure I is a partially completed perspective of a tire embodying my invention.

Figure II is a cross section view in the transverse plane 2—2 of Figure I. The tire not being shown under load.

Figure III is a cross section similar to Fig. II, showing the structure under load and the deep channel partially closed against casual road dirt.

The type of structure contemplated in this invention comprises a metallic one-piece rim 5, preferably having flanges to more securely retain the tire thereon and upon which is wound the continuous flat bands of the tire body 1; all in accordance with the well-known methods practiced in this art. The uniformly spaced traction notches 3 are of substantial width, radially disposed, and designed to afford the maximum tractive grip on the road—it is noted that they preferably do not intersect the central channel 4. The central channel, which weakens the tire tread transversely, is of substantial depth and width, but not so deep as to seriously impair the weight carrying properties of the structure nor to affect the strength of the anchorage of the tire, as a unit, to the metallic rim.

The presence of the deep median channel insures that the tire will possess a degree of resiliency transverse of its face tending to adapt it to conform to extraordinary local stresses and escape injury under conditions which would damage a tire not so fortified; for instance, a heavily loaded tire, thus deeply grooved, in passing over a boulder mid way of its breadth would open outwardly of the division, affording adequate stress relief; or, if the obstruction were small, it would be completely enveloped within the channel without imparting an appreciable vibration or jolt to the vehicle, this being a matter of great concern in the use of high speed heavy duty trucks. In running over an obstruction close to an outer edge of the tire that half in contact will tend to rebound inwardly, compressing and bending the contiguous portion affected into the open channel, thus either slipping completely off the interfering object or substantially relieving the incidental stresses set up and minimizing the probability of stripping or defacing the well-defined edge of the structure; this mutilation of the edges of transversely intact, or if grooved, insufficiently separated, tire treads is a notorious condition and can be observed daily, especially in the case of tires run continuously over rough roads.

In order that the transverse resiliency may be of uniform degree at all points circumferentially the deep channel has been placed in the median plane of the structure and made of uniform cross sectional form, thus avoiding zones of varying degrees of resiliency, a condition arising where the direction of the groove is other than straight. The central channel being preferably substantially straight-sided will resist unnecessary spreading occasioned by the wedging therein of road accretions, a condition tending to eventually split a tire having a groove shaped to offer an easy entrance to casual road dirt, or a tread that is completely divided. In fact, the tendency of the substantially straight-sided channel will be to close at its zone of contact with the road due to the sidewise surface displacement of the resilient media of the tire under compression; thus, such dirt that may be trapped therein will be readily spilled out when the channel opens up as it loses contact with the road. The tendency of the channel to close and thereby reduce its width at the point of contact under load will not diminish its usefulness in relieving stress encountered in passing over a hard unyielding substance, as a stone, which will force itself into the resiliently constricted outlet.

By reference to the drawings it will be noted that preferably well defined edges characterize the boundaries of the structure transversely; that is, the edges of the tire at their sides, as also the side walls of the channel terminate in comparatively sharp edges, also the side notches are broad and preferably terminate short of the median channel at their intersection with the tread surface in a square, box-like manner—the purpose of this combination of well defined edges is to provide projections of the utmost effectiveness against side slippage, it being apparent that the arrangement presented will be most efficient, especially on a yielding road bed.

It is noted that the tread surface of my tire is transversely flat to provide the maximum weight supporting area for the purpose of diminishing the unit stress of the material and that the vehicle can negotiate muddy or heavy roads without sinking unduly.

The deep and wide traction notches, which extend far into the face of the tread, not only afford strong driving clutches but further serve as voids into which the circumferentially displaced material may flow and by which the destructive phenomena known as "traction wave" may expend itself. The depth of these notches as also that of the median channel is such that the tangentially imparted driving stresses and those laterally administered, as by passing over an obstruction or by side slipping, are effectively carried by the intact material below the respective openings into the adjacent structure and ultimately absorbed by the metallic base, there being no lines of inherent weakness whereby the structure may be destroyed by tearing apart or separating.

It is also noted that my preferred tire has a trapezoidal cross sectional outline, the parallel sides being substantially straight, and the wider face constituting the rim anchorage portion. The radial depth of the structure is preferably, though not necessarily, less than the width of the tread face; the above proportions and form being considered the most efficient for weight-carrying and stress-resisting purposes. The tread groove is preferably, though not necessarily, of greater depth than width; the depth being such that it shall extend well into the mass, thus relieving lateral sub-surface stresses without being so wide as to invite entrance therein of foreign material.

In further illustration of the advantages residing in the high degree of lateral resiliency afforded by the deep channel it has been proved, and will be readily apparent from the disclosure to those skilled in the art, that the near approach of the deep median channel to the inner terminus of the traction notches provides means whereby the "cupping evil" is almost, if not completely, avoided. By the "cupping evil" is meant the peculiar cup-like depression of the tire face that forms about the traction notch in a tire not provided with a central void adjacent a side notch into which the laterally flowing compressed material at the zone of traction can expand and be relieved of its stresses. In rolling, it is apparent that the material lying between a pair of side notches will become banked up at the end of the pad last to lose contact with the road; also, that this accumulated excess will relieve itself circumferentially by release into the notched void. It is also apparent that the accumulated flow of the material seeks lateral escapement both outwardly and toward the median plane of the structure by expansion into the aforesaid channel; thus the stresses are laterally dissipated to an equal degree outwardly and inwardly, relieving the structure in the vicinity of the inner end of the notch from accumulations which, without a central expansion void, would be carried around the end of the notch and into the adjacent pad in a highly concentrated form and resulting in the deformation or cupping of the structure.

In proportioning the several depressions in this structure I prefer that the depth of the central channel be somewhat less than that attained by the outer terminus of the base of the traction notches, and that the width of said channel shall be less than that of said notches, and that the notches do not quite intersect the channel, merely in the interest of continuity of rolling surface. Also that the peripheral dimension of a tooth-like portion of either of the counterpart divided treads lying between a pair of notches shall be not greater than the width of the flat tread; it being considered that the substantial maintenance of these properties is conducive to the best results, though none of the proportions are of the essence of the invention.

Having thus described my invention and the preferred embodiment of it, what I claim as new therein and desire to secure by Letters Patent is:

1. The combination with a unitary metallic rim having flanged edges, of a resilient unitary tire structure irremovably formed thereon, said structure having a transversely flat outer face of less width than its rim attaching face and being of relatively greater width than of radial depth, a plurality of traction notches in the opposite edges of the tire in spaced and staggered relation with complementary opposed notches, a median channel in the tread of substantially greater depth than width and having substantially parallel walls adapted to become constricted at their edges in the zone of contact with the road whereby ingress of road dirt is restricted.

2. A resilient unitary tire structure formed on a metallic rim and having a transversely flat traction surface of greater width than its radial depth, a median channel of substantial depth in the tread adapted to divide the surface thereof into counterpart resilient members whereby lateral resiliency is obtained and whereby the resilient media of the opposed tread elements under lateral displacement in the zone of road contact will tend to constrict the channel, a plurality of traction notches in the opposite edges of the tire in spaced and staggered relation with complementary opposed notches, said notches being in open intersection with the traction surface and the sides of the structure and terminating short of intersection with the central channel.

3. A tire structure, comprising a unitary resilient tire having a transversely flat traction surface, a plurality of traction notches in the opposed edges, a deep median channel in the tread adapted to impart the maximum transverse resiliency without unduly impairing the weight sustaining properties thereof, said channel and said notches being so proportioned that they do not intersect, whereby at the nearest point of approach, the inwardly flowing material of the structure within the zone of traction will expand into said channel affording stress relief and eliminating the cupping of the material adjacent the inner termini of the notches.

4. A resilient unitary tire structure having a traction surface substantially flat transversely, said tire being of trapezoidal cross sectional outline with the narrower parallel face constituting the traction portion, a channel in the median plane of the traction portion, a plurality of radially disposed traction notches in the opposed sides of the tire in spaced and staggered relation, said notches being also in open communication with the traction face of the tire and terminating short of the median channel, said median channel being adapted to become constricted under load within the traction zone and to afford lateral stress relief of the tire media adjacent the inner termini of said notches, whereby the banked-up material due to traction wave is released therein without cupping.

5. A resilient unitary tire structure having a traction surface substantially flat transversely, a channel in the tread in approximately the median plane thereof, said channel extending deeply within the tire mass and being so formed that it will tend to close at the tread in the zone of traction, a plurality of substantially deep traction notches in each of the sides of said tire and partially separating the tread surface and terminating short of intersection with said channel, said notches and said channel being so proportioned and related that the traction wave will be interrupted at frequent and regular intervals and dispersed, whereby the face of the tread is protected from destructive cupping, and whereby the weight-sustaining and stress-diffusing properties of the structure are not materially diminished.

6. A resilient unitary tire structure having a tread surface substantially flat transversely, a plurality of traction notches in the opposed sides of the tire in open communication with the tread surface, each notch extending approximately to the median plane of the tread and being arranged in spaced and staggered relation with respect to opposed complemental notches, and a deep channel disposed approximately in the median plane of the tread and of uniform cross-sectional form, said channel and said notches being so proportioned and related that the traction wave will not be carried around the inner termini of said notches and whereby the weight-sustaining properties of said tire will not be materially diminished.

7. A resilient unitary tire structure having a tread surface substantially flat transversely, a plurality of traction notches in the opposed sides of the tire in open communication with the tread surface, and a substantial void in approximately the median plane of the tread adjacent the inner termini of said traction notches.

In testimony whereof I affix my signature.

FREDERICK W. SHERWOOD.